Dec. 13, 1966  L. M. MOYROUD  3,291,015
TYPE COMPOSING APPARATUS
Filed May 20, 1964  10 Sheets-Sheet 1

INVENTOR.
LOUIS M. MOYROUD
BY
ATTORNEYS

Dec. 13, 1966   L. M. MOYROUD   3,291,015
TYPE COMPOSING APPARATUS
Filed May 20, 1964   10 Sheets-Sheet 2
FIG. 2
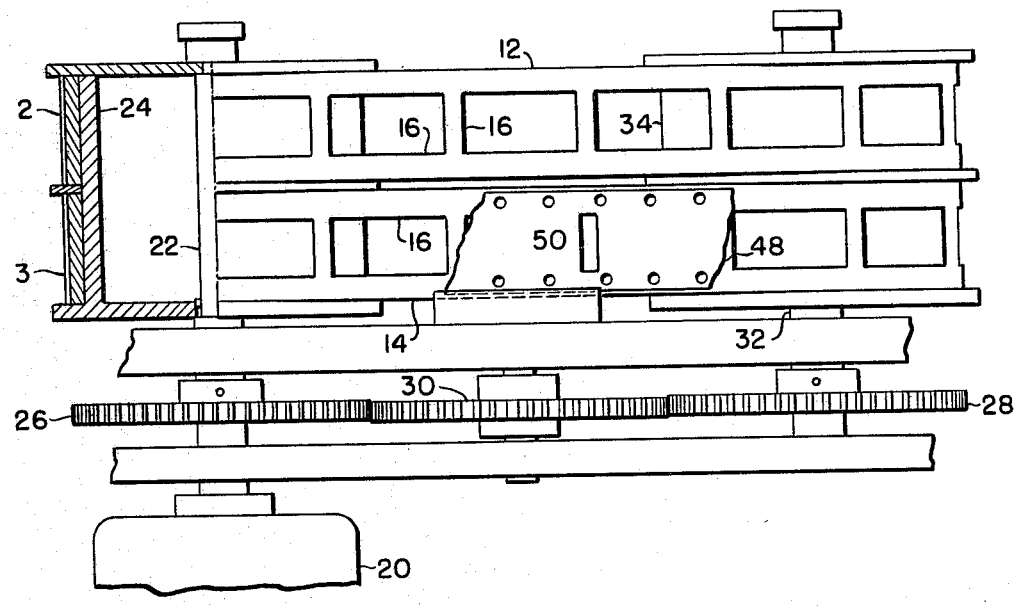
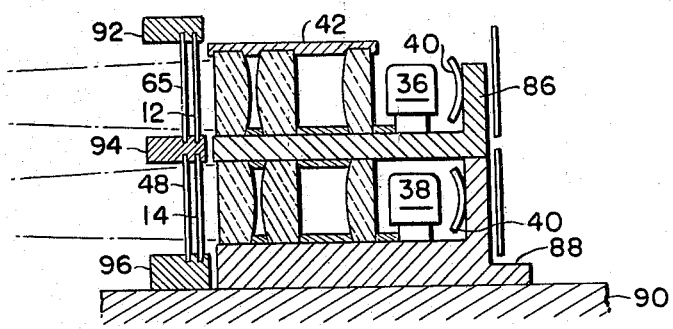
FIG. 3
INVENTOR.
LOUIS M. MOYROUD
BY
ATTORNEYS Dec. 13, 1966    L. M. MOYROUD    3,291,015
TYPE COMPOSING APPARATUS
Filed May 20, 1964    10 Sheets-Sheet 3
FIG. 4
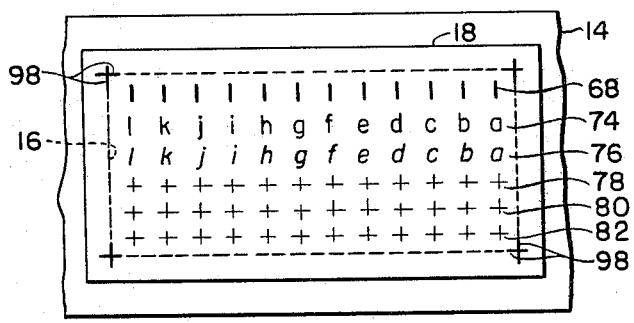
FIG. 5
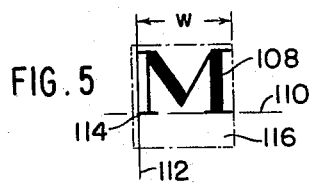
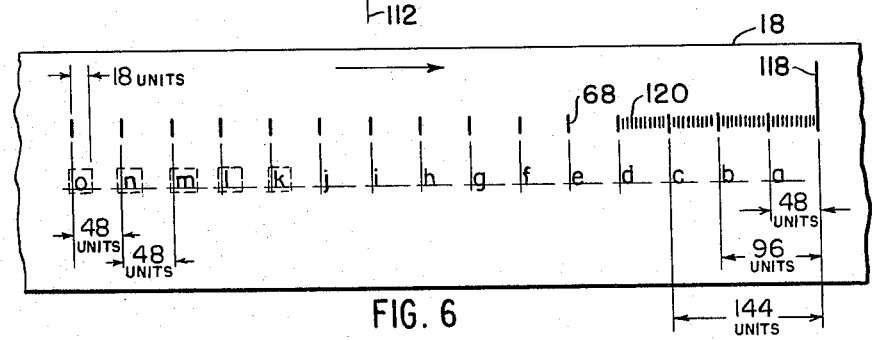
FIG. 6
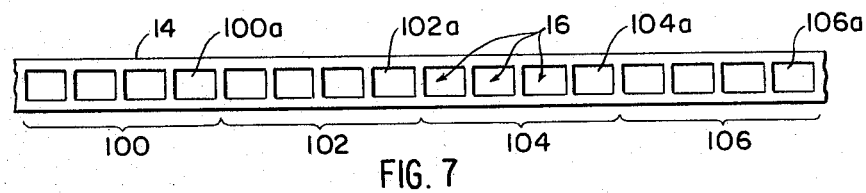
FIG. 7
INVENTOR.
LOUIS M. MOYROUD
BY *Kenway Jenney*
*& Hildreth*
ATTORNEYS Dec. 13, 1966  L. M. MOYROUD  3,291,015
TYPE COMPOSING APPARATUS Filed May 20, 1964  10 Sheets-Sheet 6

INVENTOR.
LOUIS M. MOYROUD
BY *Kenway Jenney*
*& Hildreth*
ATTORNEYS

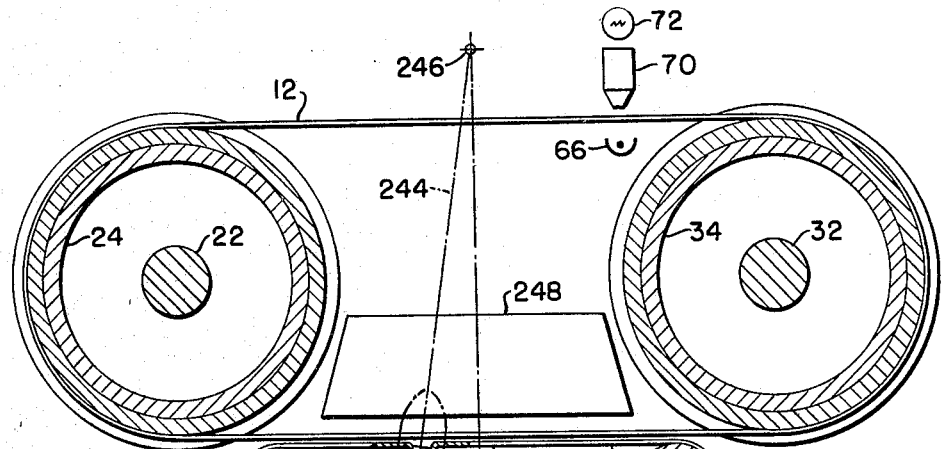
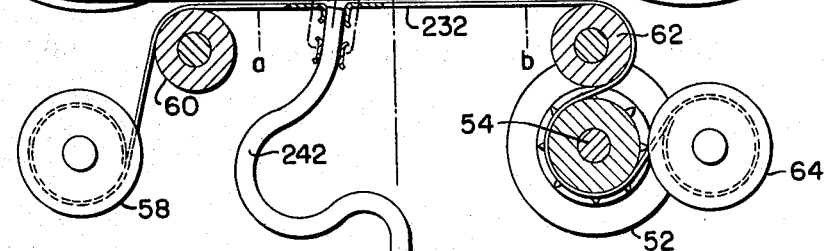
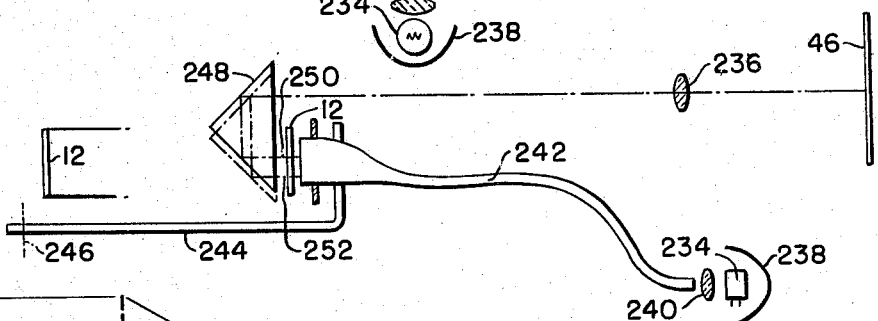
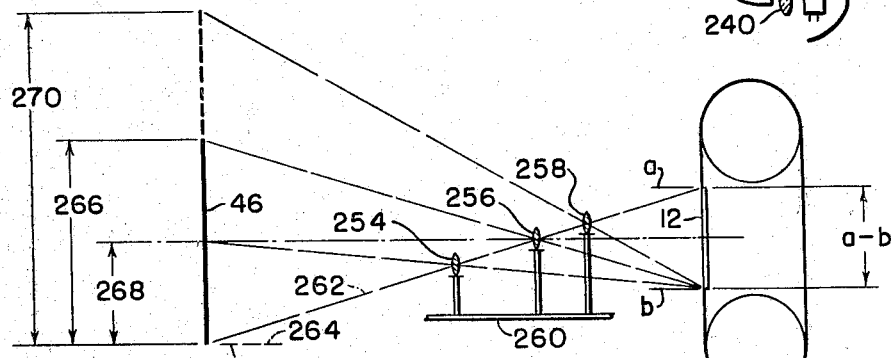

Dec. 13, 1966  L. M. MOYROUD  3,291,015
TYPE COMPOSING APPARATUS
Filed May 20, 1964  10 Sheets-Sheet 10

FIG. 17

| RANK | Tape Channel B 32 | C 16 | D 8 | E 4 | F 2 | G 1 | LOWER CASE | UPPER CASE | RANK VALUE | RANK | Tape Channel B 32 | C 16 | D 8 | E 4 | F 2 | G 1 | LOWER CASE | UPPER CASE | RANK VALUE |
|---|---|---|---|---|---|---|---|---|---|---|---|---|---|---|---|---|---|---|---|
| 1 | | | | | | 1 | a | A | 48 | 27 | | 16 | 8 | | 2 | 1 | Period | 'Quote | 1296 |
| 2 | | | | | 2 | | b | B | 96 | 28 | | 16 | 8 | 4 | | | Comma | ! | 1344 |
| 3 | | | | | 2 | 1 | c | C | 144 | 29 | | 16 | 8 | 4 | | 1 | ; | : | 1392 |
| 4 | | | | 4 | | | d | D | 192 | 30 | | 16 | 8 | 4 | 2 | | / | vert. bar | 1440 |
| 5 | | | | 4 | | 1 | e | E | 240 | 31 | | 16 | 8 | 4 | 2 | 1 | = | + | 1488 |
| 6 | | | | 4 | 2 | | f | F | 288 | 32 | 32 | | | | | | | ? | 1536 |
| 7 | | | | 4 | 2 | 1 | g | G | 336 | 33 | 32 | | | | | 1 | 2 | Hyphen | 1584 |
| 8 | | | 8 | | | | h | H | 384 | 34 | 32 | | | | 2 | | 3 | Ψ | 1632 |
| 9 | | | 8 | | | 1 | i | I | 432 | 35 | 32 | | | | 2 | 1 | 4 | ⅜ | 1680 |
| 10 | | | 8 | | 2 | | j | J | 480 | 36 | 32 | | | 4 | | | 5 | % | 1728 |
| 11 | | | 8 | | 2 | 1 | k | K | 528 | 37 | 32 | | | 4 | | 1 | 6 | * | 1776 |
| 12 | | | 8 | 4 | | | l | L | 576 | 38 | 32 | | | 4 | 2 | | 7 | & | 1824 |
| 13 | | | 8 | 4 | | 1 | m | M | 624 | 39 | 32 | | | 4 | 2 | 1 | 8 | Unquote | 1872 |
| 14 | | | 8 | 4 | 2 | | n | N | 672 | 40 | 32 | | 8 | | | | 9 | ( | 1920 |
| 15 | | | 8 | 4 | 2 | 1 | o | O | 720 | 41 | 32 | | 8 | | | 1 | 0 | ) | 1968 |
| 16 | | 16 | | | | | p | P | 768 | 42 | 32 | | 8 | | 2 | | fl | ffi | 2016 |
| 17 | | 16 | | | | 1 | q | Q | 816 | 43 | 32 | | 8 | | 2 | 1 | ff | ¢ | 2064 |
| 18 | | 16 | | | 2 | | r | R | 864 | 44 | 32 | | 8 | 4 | | | fi | ffl | 2112 |
| 19 | | 16 | | | 2 | 1 | s | S | 912 | 45 | 32 | | 8 | 4 | | 1 | ½ Dash | Dash | 2160 |
| 20 | | 16 | | 4 | | | t | T | 960 | | | | | | | | | | |
| 21 | | 16 | | 4 | | 1 | u | U | 1008 | | | | | | | | | | |
| 22 | | 16 | | 4 | 2 | | v | V | 1056 | | | | | | | | | | |
| 23 | | 16 | | 4 | 2 | 1 | w | W | 1104 | | | | | | | | | | |
| 24 | | 16 | 8 | | | | x | X | 1152 | | | | | | | | | | |
| 25 | | 16 | 8 | | | 1 | y | Y | 1200 | | | | | | | | | | |
| 26 | | 16 | 8 | | 2 | | z | Z | 1248 | | | | | | | | | | |

| CHARACTER | WIDTH IN UNITS | ACCUMULATED WIDTHS OF PREVIOUS CHARACTERS | RANK VALUE | FLASH VALUE |
|---|---|---|---|---|
| P | 12 | 0 | 768 | 768 |
| h | 10 | 12 | 384 | 396 |
| o | 9 | 22 | 720 | 742 |
| t | 7 | 31 | 960 | 991 |
| o | 9 | 38 | 720 | 758 |
| n | 10 | 47 | 672 | 719 |

FIG. 18

INVENTOR.
LOUIS M. MOYROUD
BY *Kenway Jenney*
*& Hildreth*
ATTORNEYS

United States Patent Office 3,291,015
Patented Dec. 13, 1966

3,291,015
TYPE COMPOSING APPARATUS
Louis M. Moyroud, 355 Middlesex Ave.,
West Medford, Mass.
Filed May 20, 1964, Ser. No. 368,839
17 Claims. (Cl. 95—4.5)

This application is a continuation-in-part of copending applications Ser. No. 338,810, filed Jan. 20, 1964 and Ser. No. 120,313, now Patent No. 3,188,929, filed June 20, 1961. The present invention relates generally to photographic type composing apparatus of the kind that projects the characters in each line singly and successively as they appear in the line, either right-reading or reverse-reading. More particularly, the invention relates to apparatus employing means to cause the images of all selectable characters to pass successively and repeatedly, in focus, along the entire length of the line. Flash means are employed to illuminate each character when its image is located at a position in the line where it is to be photographed.

A principal object of the invention is to employ flash photography in photocomposition of precise typographical quality, at speeds substantially greater than those readily attainable in previously used flash composing machines. Some machines in current use, exemplified by the one descrbed in Patent No. 2,790,362, contemplate the intermittent variable movement of a carriage to space successive character images according to their respective widths. This mechanical movement requires time and the result is that the flashes cannot be repeated for successive characters at a rate as great as that now attainable with modern flash lamps.

Accordingly, the objects of this invention include a fuller use of the short deionizing times and high repetition rates of modern flash tubes.

Other machines in current use contemplate the continuous movement of parts which effect character spacing in each line. The flashes are timed, in such machines, to occur at time intervals proportional to the variable spacing of the characters. Such machines have bulky and expensive optical equipment and are relatively slow in operation. A further object of this invention is to avoid complex optics while yet obtaining precise, variable character spacing.

Still other objects include provisions for rapid selection from a number of fonts, justification and the use of stored line information prepared at independent keyboards and transferred to the photocomposer for running at speeds far in excess of that of a human keyboard operator. In this manner, more efficient use may be made of such available machines as keyboard-operated tape perforators and computers which produce outputs for perforated or magnetic tape recording. Whereas the current output of one to three such keyboard machines is employed on standard, slow-speed linecasters or photocomposers, this invention contemplates that a single photocomposer can handle the outputs of several times this number of keyboard machines.

With the foregoing and other objects hereinafter appearing in view, the features of this invention include a novel luminous beam limiter to be used in conjunction with the apparatus described above, whereby the light reaching the sensitized sheet is limited to the region including only the character in the line next following the last character projected therein.

According to a second and related feature, the luminous beam limiter is movable along the line independently of the character images and has its position defined by the cumulative widths of previously-flashed characters, whereby only the single character next following in succession in the line will be photographed at any time.

Other numerous features of the invention relate to the use of the foregoing features and principles of operation in conjunction with many other necessary or desirable typographical features. Such features include justification, selection from multiple fonts, selection from multiple cases, and other features that will become evident from the following description, having reference to the appended drawings in which FIG. 1 is a plan view in section of the optical and mechanical section of a preferred embodiment of the improved machine;

FIG. 2 is a front elevation in section, taken on line 2—2 of FIG. 1;

FIG. 3 is a side elevation in section taken on line 3—3 of FIG. 1;

FIG. 4 is a view of a single film matrix used in a preferred embodiment of the invention;

FIG. 5 is a diagrammatic representation of a matrix character, used for purposes of explanation;

FIG. 6 is a fragmentary view of the character matrix illustrating the relative positions of character areas on the matrix;

FIG. 7 is a developed view of a matrix strip in a preferred embodiment of the invention;

FIG. 13 is a plan view in section of a second alternative embodiment using a flexible light guide;

FIG. 14 is a fragmentary side elevation of the system shown in FIG. 13;

FIG. 15 is a diagram representing the relative positions of projection lenses in the preferred embodiment of the invention;

FIG. 17 is a table giving information concerning the characters used in the described machine; and FIG. 18 is a table giving pertinent information concerning the example of FIGS. 8a to 8f.

Figure 1:
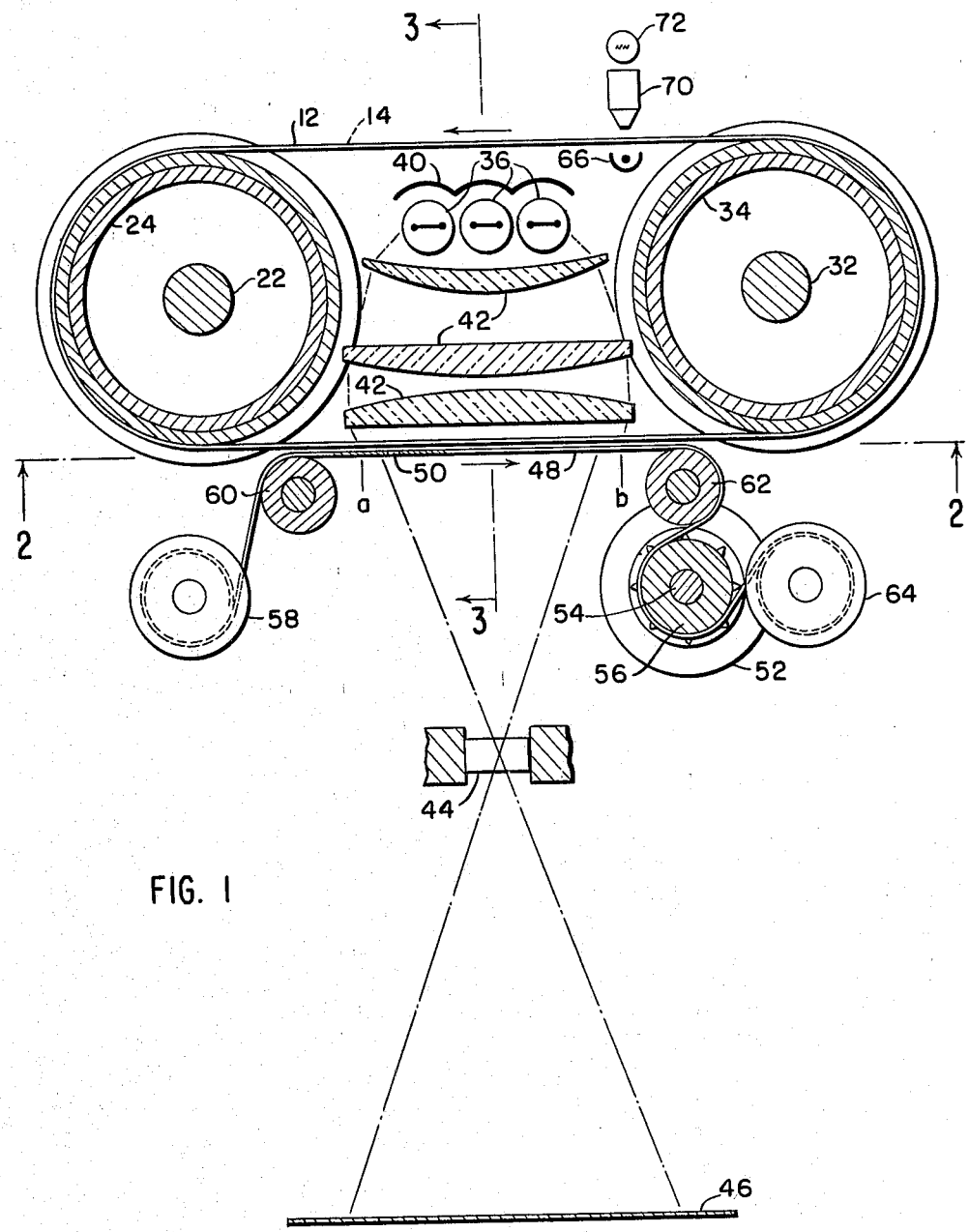

Referring to FIGS. 1 to 3, master characters (transparent on opaque background) are located on each of a pair of endless, continuously moving matrix bands 12 and 14. These bands are preferably made of thin flexible material such as steel, with rectangular apertures 16 (FIG. 2) over each of which is bonded a film matrix section 18, omitted for clarity of description from FIG. 2 but shown in FIG. 4. Alternatively, the bands may be of plastic material with the desired mechanical properties.

Matrix bands 2 and 3 are driven by a motor 20 (FIG. 2) keyed to a shaft 22 (FIG. 1) to which a drum 24 is attached. Attached also to the shaft 22 is a gear 26 (FIG. 2) driving a gear 28 through an idler gear 30. The gear 28 drives a shaft 32 (FIG. 1) keyed to a drum 34 so that no mechanical stress is applied to the matrix bands in driving them.

The straight sections of the bands between reference lines a and b are located within an optical projection fields and are intermittently illuminated at predetermined times by flashes of extremely short duration generated by flash lamps 36 and 38 associated with the bands 12 and 14, respectively. The flash lamps are associated with reflectors 40 and condensing lens systems 42. The optical system is such that images of the discharge arcs of the lamps are made in approximately the median plane of a projection lens 44. A film 46 is positioned to receive the images of the straight sections *a–b* of the bands formed by the lens 44. The images of both bands are caused to merge by optical means described more fully in connection with FIG. 10. Thus the section *a–b* of the band 12 may be projected; or, the section *a–b* of the band 14 may be projected to the same image position, alternatively at any predetermined instant. For the immediately following description it is assumed that the band 14 is being photographed.

It should be understood that all the characters of the alphabet carried by the matrix band 14 are continuously passing in succession through the projection area defined by the section *a–b*. Thus, in a manner partially similar to that disclosed in my copending application Ser. No. 120,313, filed June 28, 1961, now Patent No. 3,188,929, potential images of all characters of the alphabet are continuously sweeping the width of the film 46 in the direction of a line of type. In order to project a full line on to the film 46 by photographing the characters in successive order as they appear in the particular line, the entire alphabet must pass a number of times through the section *a–b*. It is also necessary to flash the lamps 36 at the right times, once or several times during each passage of the alphabet, and also to mask all the characters of the alphabet in the section *a–b* at the times the flashes occur, except the characters then being photographed. The masking of undesired characters is obtained by a luminous beam limiter in the form of a shutter band 48 provided with a window or aperture 50. The scale of this window is distorted in FIGS. 8*a* to 8*f* to make possible a detailed description, appearing at a later point herein. The rate of motion of the shutter band 48 is determined by the rate at which characters are being projected on to the film, and its position is determined by the accumulated widths of the characters previously photographed. The displacement of this shutter band is controlled by a stepping motor 52 (FIG. 1) in the present embodiment, in a manner which will be described below.

The stepping motor 52 drives, through a shaft 54, sprocket wheels 56 engaging the shutter band 48. The shutter band is continuously pulled by a clock spring mounted in a drum or reel 58 which tends to rotate said drum clockwise as viewed in the drawing, and thus continuously pulls the shutter band to the left against the normal direction of the motor 52. The shutter band is maintained at a close distance from the matrix band 14 by idler rollers 60 and 62. Another spring loaded drum 64 prevents any slack from developing in the system. At the end of a line, the motor 52 is reversed to return the window 50 of the band 48 to a position near the point *a* for the beginning of the following line. There is also an exactly similar shutter band 65 for the matrix band 12 as shown in FIG. 3.

As the matrix band 14 is continuously moving, photocell pulses are generated by a photocell 66 which receives, through transparent slits 68 provided on a film matrix section 18 (FIG. 4), the light emerging from an optical system 70 associated with an exciter lamp 72. These photoelectric pulses are utilized to determine at which time the flash lamps 36 should be energized to project the desired character. Although the photocell system has been represented for illustration in the drawing in an "inactive" section of the matrix band, it should be understood that this system is preferably located close to the active area *a–b* of the belt to insure the accurate spatial relationship of the slits 68 to the characters whose photography they control.

In a preferred embodiment of the invention two matrix bands 12 and 14 are used as shown in FIGS. 2 and 3. There are two identical optical systems 42 and two flash lamp units 36 and 38, one for each matrix band. As shown in FIG. 4 the characters are arranged on each matrix section 18 in levels 74, 76, 78, 80 and 82. Selected characters from the corresponding levels on the bands 12 and 14 are merged by an optical system described below so that characters from the two bands may be selectively projected on the same base line on the film. The flash and optical systems of the upper matrix band 12 are mounted on a frame 86 supported on a sub-frame 88 on which the flash and optical units of the lower matrix band 14 are attached. Both frames are secured to the general base of the machine shown at 90. It is important that the "active" section *a–b* of the matrix bands (FIG. 1) remains in the same plane and does not vibrate up and down or in and out, to insure character alignment and good focus. For this purpose, grooved guide rails 92, 94 and 96 (FIG. 3) are attached to uprights (not shown) secured to the general base of the machine. In the embodiment described in relation to the drawings, it is assumed that each matrix band is provided with apertures 16 as shown in FIGS. 2 and 7. A film matrix section 18, FIG. 4, is secured by mechanical means, or bonded or otherwise attached, to the band 14 at an accurately predetermined position. For this purpose matrix reference lines 98 are utilized. These lines, which are located at the four corners of the film matrix, are brought to exact register with the cutout corners of the aperture 16 before bonding.

In the example of FIG. 4 each film matrix section 18 has five rows of twelve characters each. In the example shown, each row corresponds to a different style. For example, the row 74 has a roman alphabet, the row 76 has an italic alphabet, the row 78 has a boldface alphabet, the row 80 has sans serif face, and the row 82 a bold sans serif face. There is a slit 68 associated with each character column for the purpose of generating photocell pulses as explained above. The complete upper case alphabet in each of these styles appears on four successive sections 18 of the matrix band 12. The band 14 has the corresponding lower case characters. Means are provided to bring the images of all of the rows on both bands to a common base line on the film 46. In another embodiment of the invention, each matrix strip may include a complete alphabet rather than portions of alphabets of different styles. In that case, characters of different rows are brought to the same base line on the film by static optical merging means.

In the embodiment presently being described, the matrix band 14 is shown in FIG. 7 as provided with four groups of four apertures 16 each. These groups are shown at 100, 102, 104 and 106. The arrangement of film matrix sections in these windows depends on the selected mode of selection of fonts, cases and characters, and this can be changed at will by simple adjustment. If high composing speed is desired in preference to a large choice of styles, the four groups of apertures receive identical film matrix sections 18. Assume for example that there are identical film matrix sections at 100*a*, 102*a*, 104*a* and 106*a*. The purpose of this arrangement would be to increase the number of repetitions of one alphabet in one cycle of movement of the band 14. If, on the other hand, it were desired to obtain greater versatility in font selection from the machine at a lesser speed, each of the four groups of four apertures each would be provided with five alphabets of uniquely different styles. The capacity of the machine in such an arrangement would be increased from five styles to twenty styles. Of course, in this case the machine speed would be substantially decreased because the same character of the same style would cross a point located in the "active" section *a–b* (FIG. 1) only once for each complete cycle of the matrix bands.

In the preferred embodiment the upper matrix band is provided with upper case characters and the lower matrix band with lower case characters, as previously stated, and there are five different styles on each band which can be mixed at will through optical and/or mechanical image merging means. Suitable optical means include sliding or rotating prisms or mirrors, or moving lenses, as will be evident to one skilled in optics. Mechanical means may include the simultaneous displacement along their shafts of the two matrix drums 24 and 34 in order to bring a selected character row on to the optical projection line.

With the arrangement described above, each complete alphabet of a given style sweeps the projection section a–b (FIG. 1) four times during each cycle of the matrix band. The band may travel at, for example, 15 cycles per second to photograph on the average sixty characters, plus approximately thirty percent more which can be photographed within the same interval because of a feature presently to be described which permits more than one character to be photographed per alphabet sweep. The additional twenty characters are added to the sixty characters per second to produce a total rate of eighty characters per second.

As mentioned above, in order to project a line, it is necessary to determine at what time during the continuous operation of the machine the flash unit should be energized, and at what position the shutter band 48 must be at this time. The operation of the shutter band will be explained in relation to FIGS. 5, 6 and 8. Each master character such as 108 of the matrix is accurately located on the matrix section 18 in relation to two lines which determine, respectively, the alignment of character images on a common base line and the spacing between characters in the final line. The base line is shown at 110 in FIG. 5 and the reference line which determines intercharacter spacing or "fitting" is shown at 112. These two lines intersect at a "reference point" 114. The maximum area available for each master character is represented by a shaded area 116. The width in units of the character, based on a scale in which the em has a predetermined width such as eighteen on the same scale, is measured from the line 112. This width includes any normal intercharacter space extending to the right of the typographical design calls for such added space. In the example of FIG. 5 the width of character "M" is shown as "w." This width is usually an em of eighteen units.

A matrix section 18 is schematically represented in FIG. 6. It is assumed, as shown, that character areas limited by vertical reference lines 112 are equally spaced by a distance equal to forty-eight units, on the given scale. The widest area associated with any character is, in the assumed case, eighteen units wide, but certain kerned italic characters can project slightly to the left of the vertical reference line 112. FIG. 6 shows that there is a transparent slit or other photoelectric impulse generating mark 68 associated with each character. These slits are the timing marks used in the system to generate electrical pulses as the matrix band is moving. An additional slit 118 located at another level is used in conjunction with a separate photocell to give a signal at the time the first character of a complete alphabetical sequence approaches the "start" line a (FIG. 1) corresponding to the earliest time at which a character can be projected. There may, in another embodiment, be different "head of sequence" lines such as 118 for each aperture 16 of FIG. 7. In the example presently being described, it is assumed that there is "one head of sequence" line 118 only for each of the four-window groups 100 to 106.

Turning to FIG. 6, it can be seen that the character areas are rather widely spaced. The purpose of this arrangement, as will be shown below, is to leave a large tolerance in the positioning of the aperture 50 in the shutter band 48, so that the movement of this band could be considered as practically continuous during the composition of a normal line, in spite of the fact that character widths constantly vary. In this preferred embodiment there is only one timing slit 68 every forty-eight units but it is possible to have one slit for each unit with forty-eight marks between characters. This alternative arrangement is illustrated at 120. In the latter case the marks would be spaced by very small distances, and for that reason it has been found more convenient to use more widely spaced marks and to generate finer individual unit pulses by a pulse generator operated in synchronism with the character band, as described below in connection with FIG. 9.

Figure 9:
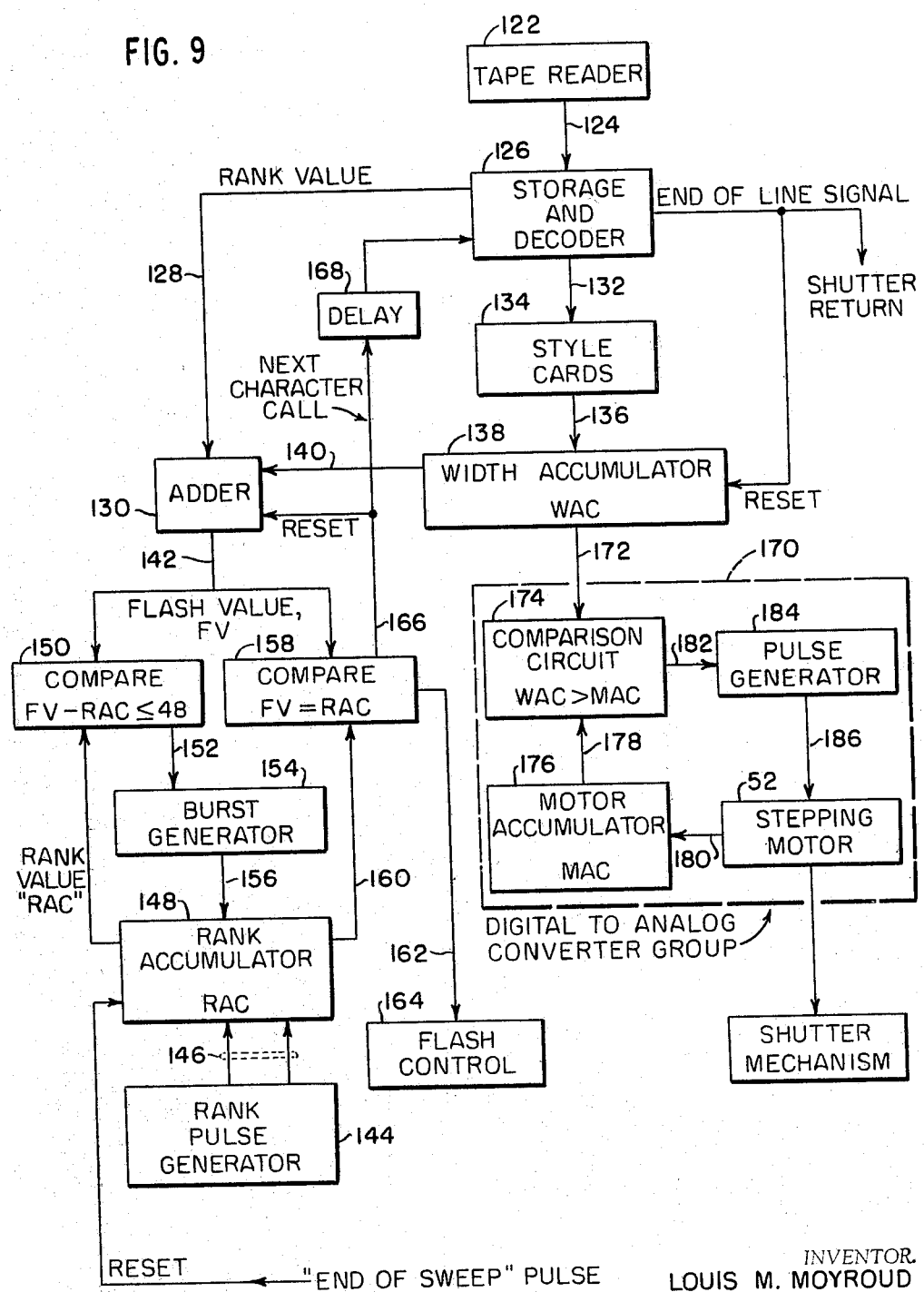
FIG. 9 is a block diagram of the circuits used to control the machine in a preferred embodiment of the invention.

An embodiment of the control circuit of the machine is shown in block diagram form in FIG. 9. Although a machine embodying the present invention can be directly controlled from a typewriter, its greater speed capabilities are such that it is preferably controlled by punched paper tape or magnetic tape. The characters, fixed spaces, justifying spaces, special functions and other control codes are stored in the tape in coded form, for example as shown by tape channel positions B to G in FIG. 17. The tape is inserted into a tape reader shown at 122. The tape is advanced step by step to project a line on to the film character-by-character; or alternatively, it can be moved continuously between two end-of-line signals if higher speeds are desired. In the latter case the coded information relating to the full line would be transferred over wires 124, to a storage-decoder 126. It is also possible to have a limited storage 126 for no more than a few characters from which the information is extracted at variable speeds depending on the rate at which these characters are flashed. In this latter case, each time a character code is extracted from the storage, the tape is moved one step to replace the code, which has been removed from the limited storage, by a new code. All of these methods are well known and will not be described here in specific detail.

The characters cross the "start projection" line a of FIG. 1 in the same sequence in which they appear in FIG. 17, as represented by the "rank" column of the table. The right-hand column shows the "rank value" of the various characters which, as it can be seen, are directly proportional to the positions of the characters in the alphabet. This rank value represents the time that will elapse between the "start projection" signal and the time the reference line 112 of the character crosses the line a. The rank value given in the table is for characters spaced forty-eight units apart on the matrix.

It is, of course, not necessary to utilize the rank value of characters on the matrix section 18 as their identifying code on the tape, but if a different code is employed on the tape decoding means must be used. In any case, wires 128 transfer to an adder 130 the rank values of the characters as they are extracted from storage. The purpose of this adder is to add the rank value of each character of the line as its turn for photography is reached to the accumulated widths of all the characters in the line which precede this particular character and which have already been flashed. Justifying spaces and fixed spaces are added in the same way. For this purpose spaces can be considered as "blank" characters.

In order to accumulate the widths of all the characters of the line as it is being composed, it is of course necessary to determine the individual width of each character as it is extracted from storage. This width may or may not appear in the tape. If it does not, as in the assumed embodiment, the proper width is found by decoding as follows:

From the unit 126 emerges a cable 132 containing as many wires as there are different characters in the alphabet. These wires are directed to a style card unit 134 which operates according to the style selection system described in my copending joint application Ser. No. 741,209, filed June 9, 1958. The purpose of the style card unit 134 is to assign to each character represented by a wire emerging from the decoder 126 its relative width "w" (FIG. 5). The style card unit 134 preferably also includes a binary width encoder. In the preferred system the width of any character is in the range between zero and eighteen units. Half units may also be used for better fitting. In order to take care of these various widths, there are six binary wires in an output cable, cable 136, representing in binary form any width from half-a-unit to eighteen units.

The cable 136 transfers the width value of every character as it is flashed to a width accumulator 138. This width accumulator is reset to zero at the beginning of each line, and at any time during the composition of a line its value represents the accumulated widths of all the characters of the line which have been flashed. This value is transferred through wires 140 to the adder 130, where it is added to the rank value of the latest character extracted from storage, which will be the next character to be flashed. The adder thus represents on wires 142 what is called the "flash value" of the next character, which value determines the instant at which the flash will be triggered to project that character. In the present circuit, it is assumed that the width of this latest character is held in the storage unit 126 until the flash has actually occurred, so that the value transferred by the accumulator 138 to be added to the rank value of said character does not include its own width. This procedure is of course not necessary, but where the character width is entered at the same time as its rank value, a different definition of the relative positions of reference lines in FIG. 5 must be adopted.

A pulse generator associated with the matrix band is shown at 144. This unit generates a pulse for each slit 68 (FIG. 6) each time a character of the matrix crosses a fixed point, as explained above. As characters are spaced by forty-eight units, this means that each interval between consecutive pulses generated by the unit 144 represents a matrix band displacement of forty-eight units. Consequently, through wires 146, forty-eight units are transferred from the unit 144 to a rank accumulator 148 each time a pulse is generated. The value in the rank accumulator 148 is continuously compared in a comparison circuit 150 to the flash value "FV" of the character next to be flashed. The circuit 150 may take the form, for example, of that described in my copending joint application Ser. No. 312,838, filed Sept. 27, 1963. As soon as the difference between the flash value of this character and the accumulated rank value "RAC" is less than forty-eight units, the character to be flashed will be the next character to appear within the aperture 50. At this point, the comparison circuit 150 generates an output pulse on a wire 152 to trigger a pulse burst generator 154. This burst generator generates forty-eight pulses for each photocell pulse from the unit 144. As soon as the burst generator is triggered by the wire 152, the pulses it generates are transferred by a wire 156 to the rank accumulator 148. The value in the latter thus increases, and as soon as it is found to be equal to the flash value "FV" by a second, similarly constructed comparison circuit 158, connected to the rank accumulator by a wire 160, a pulse is transferred by a wire 162 to a flash control circuit 164. This pulse will trigger the flash which will project the character which was last extracted from the storage unit 126. At the same time, the comparison circuit 158 sends a pulse over a wire 166 to reset the adder 130, to extract from the storage 126 the next character to be flashed, and to transfer the width of the "just flashed" character to the accumulator 138. This operation can, if desired, be delayed by a delay circuit 168 in any case where it is desirable to allow a few milliseconds as a minimum time between the projections of two consecutive characters. This may be necessary to leave time for the electronic flash circuit to be ready for the next flash, especially in the case where one flash unit only is utilized. No waiting period is necessary for this purpose if several flash lamps are alternatively used, as in the case of FIG. 1 where three lamps are shown at 36.

The portion of FIG. 9 enclosed by a dotted line 170 represents the preferred embodiment of the control for the shutter band 48 which has the purpose of masking all the characters of the alphabet which are in the projection section a–b at the time the flash occurs, except the one character which is to be projected. As the purpose of the portion 170 is to control the motion of the shutter band according to the movement of the active image-receiving portion of the film as the line is progressively photographed, various systems could be utilized. Basically, the portion 170 is a digital-to-analog converter. Although the system as described below is based on periodic operation of a stepping motor, it is in no way limited to this specific form.

The value in the width accumulator 138 is transferred by wires 172 to a comparison circuit 174. The purpose of this comparison circuit is to determine at what times the shutter band must be moved. For this purpose, the position of the stepping motor 52 (FIGS. 1 and 9) operating the shutter band is represented, for example, in digital form by a circuit 176. The value represented by this circuit is transferred by wires 178 to the comparison circuit 174.

A suitable form of the circuit 176 is an accumulator which is set at zero at the beginning of each line, and which is moved up during the composition of a line by a number of units representing the actual displacements of the shutter band. In this case, as the stepping motor 52 moves one step, it transfers one or several suitable pulses via a wire 180 to the accumulator 176. In any case, as soon as the comparison circuit 174 finds that the value in the width accumulator 138 is greater, by a predetermined value (for example, eight), than the value accumulated in the circuit 176, a pulse is generated by the comparison circuit 174 which is transferred by a wire 182 to a pulse generator 184. This pulse generator generates, in this embodiment, a pulse every three milliseconds. These pulses are transferred by a wire 186 to the stepping motor 52 to move the shutter band eight units for each pulse, until the displacement of the motor has moved up the accumulated width represented in the circuit 176 to a value higher than the value in the width accumulator 138.

In this preferred embodiment, the stepping motor is moving at a more or less continuous rate during the composition of a line. This is made possible by spacing the characters on the matrix sections 18 sufficiently far apart so that very little accuracy is required for the positioning of the aperture 50 in the shutter band, as described above. If desired, a second comparison circuit (not shown) could be used so that the stepping motor operation would then be controlled by an upper-limit and a lower-limit comparison circuit. For example, the upper-limit comparison circuit would stop the motor 52 for a short time, and the lower-limit comparison circuit would cause the machine to lose a cycle to leave time for the shutter band to catch up with the flashing of the line.

The operation of the preferred embodiment of the present invention will next be explained in connection with an example, having particular reference to FIGS. 8a to 8f, 9, 17 and 18. Let us assume that the first word of a line to be composed is "Photon." It is further assumed that this word is to be projected character-by-character in the same order in which it is read, although it will be obvious that the machine can be adapted for flashing characters from right to left, as an alternative. FIG. 17 shows the codes of all letters to be projected, and also the rank values of the letters. FIG. 18 represents in the second column the width values assigned to the different characters of the word "Photon." The same table represents in the central column the accumulated widths of the projected characters as the composition of the line proceeds, and the last column represents the "flash values" of the various characters of the word, obtained by adding the accumulated width values of the preceding characters in each case to the rank value of the particular character.

Figure 8A:
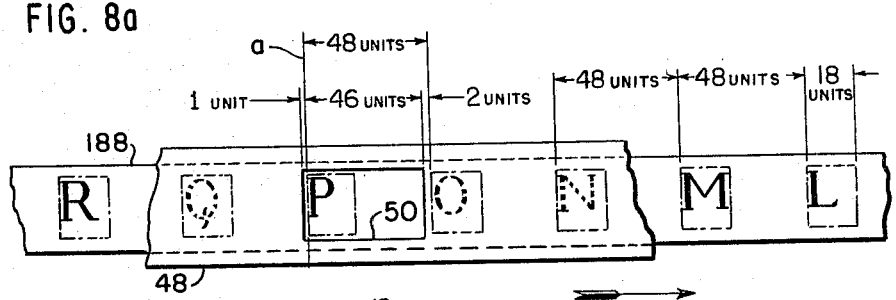
FIGS 8a to 8f are diagrams representing the shutter band operation during the projection of a typical word.
Figure 8B:
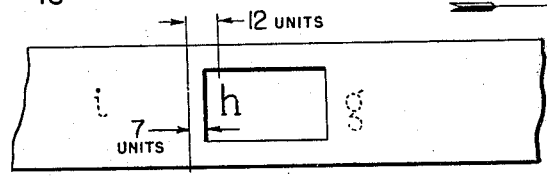
Figure 8C:
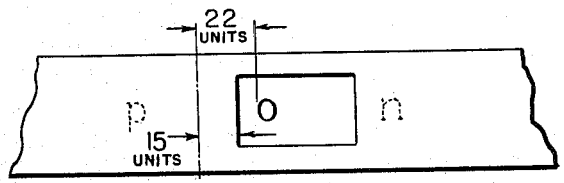
Figure 8D:
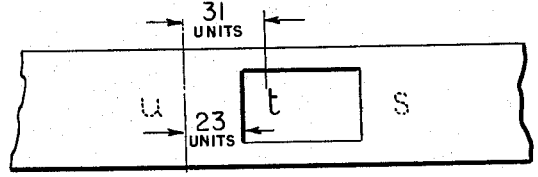
Figure 8E:
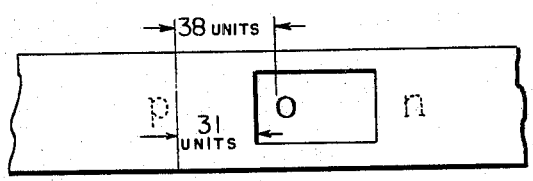
Figure 8F:
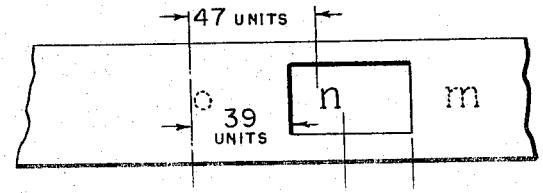

Turning now to FIG. 8a, a portion of a matrix section continuously moving in the direction of the arrow is shown at 188, and the shutter band is shown at 48 with its window or aperture at 50. Each character area 116 (FIG. 5) is eighteen units wide and these character areas are spaced forty-eight units apart as shown. The line "*a*" represents the "start projection" line as explained above in connection with FIG. 1. At the beginning of a line the window 50 is positioned in relation to the starting line "*a*" as shown in FIG. 8*a*. The first character of the line will be projected at the precise moment when its associated reference point 114 (FIG. 5) intersects the start line "*a*."

In order to take care of any slight positioning inaccuracies of the shutter band at the starting position and also to allow room for certain kerned characters, the left edge of the window 50 is preferably spaced one or more units to the left of the start line "*a*" when the new line is started. In the illustrated case, the left edge of the window 50 is one unit to the left of the start line "*a*."

It is, of course, necessary that at the time the flash occurs, no more than one character shall be projected. For this purpose the width of the window must be less than the space between consecutive characters. As shown in the figure, the window 50 is forty-seven units wide. Although there are forty-eight units of space on the matrix band between the reference lines of the characters "P" and "O," the distance from the reference line of "P" to the right-hand edge of the window is thus limited to forty-six units, leaving a two-unit margin from the latter edge to the reference line of the "O."

After the previous line has been projected and the shutter band 48 has been returned to the position shown in FIG. 8*a*, the first character of the first word to be projected in the new line is "P." This character is extracted from the storage unit 126 (FIG. 9) and its rank value, which is 768 units, is transferred to the adder 130 where it is added to the accumulated widths of previously flashed characters in that line, which is zero, giving a total flash value of 768 units, which is stored in the comparison circuits 150 and 158. During the transfer of the first character code to the computation circuit the matrix band is continuously moving. At a given point in the travel of the matrix band an "end-of-sweep" or "start-new-sweep" signal was generated by a timing mark 118, as explained above in relation to FIG. 6. This signal will have reset the accumulator 148, and by opening a suitable gate will cause the rank pulse generator 144 to enter into the accumulator 148 forty-eight units at each passage of the reference line 112 of a character past the start line "*a*." Thus the accumulator 148 will advance from zero to forty-eight units after the passage of "A" past the line "*a*" to ninety-six when "B" crosses this line, and so on until it reaches 720 units at the time the reference line of "O" intersects the line "*a*." At this point the compartor 150 emits a pulse on the wire 152 because the flash value of "P" (768 units) is then not more than fory-eight units larger than the value in the accumulator 148 (720 units). At this point the burst generator 154 becomes active and sends a pulse to the accumulator 148 for each unit of travel of the matrix band (one unit being approximately .12 mm. for 6-point matrix characters). These pulses accumulate in the accumulator 148 until its value has increased to the flash value of "P" (768). This equality is then detected by the comparator 158 at the exact moment when the reference line of "P" intersects the line "*a*" as shown in FIG. 8*a*. At this point the flash is triggered and "P" is projected.

As soon as the "P" is projected, its width then being held in the storage 126 is transferred to the width accumulator 138, and the next character "*h*" is extracted from storage and transferred to the adder 130. The width accumulator 138 is connected to the comparator 174 to keep a constant comparison between the value in that accumulator and the value in the motor accumulator 176, which was at zero at the beginning of the line. Consequently, the comparison circuit 174 emits a pulse on the wire 182 as soon as the entry of the width of "P" (12 units) into the accumulator 138 has increased the value in said accumulator above the value in the accumulator 176 by more than the value represented by one step. This causes the stepping motor to move the shutter tape one step forward. In the present embodiment one step has been chosen to be worth eight units. As the stepping motor 52 moves the shutter band by eight units, its associated accumulator 176 increases in value by eight units, so that the comparison circuit 174 becomes inactive, as the value in the width accumulator 138 is no longer larger by at least eight units than the value in the motor accumulator 176. The value of eight units for one sep of the shutter band has been selected for the purpose of this description, and it is evident that smaller or larger values can be selected. It should be pointed out, however, that by selecting a small value for one step, the motion of the shutter band will not have to be completed at the time the flash occurs. Within the limits stated above, the shutter band can be more or less continuously moving during the successive projection of characters. Thus at the time the second character of the line, that is, "*h*" is projected, the shutter band window 50 is approximately in the position shown in FIG 8*b*. This window has moved to the right by eight units as compared to the position it occupied one character earlier in FIG. 8*a*. Now, to project "*h*" in the same manner as for "P," the rank pulse generator 144 emits pulses each with a value of forty-eight to the accumulator 148 until the difference between the flash value of "*h*" and the value in the rank accumulator 148 has been reduced to forty-eight units or less. The rank value of "*h*" as shown in FIG. 18 is 384 units, and the accumulated width value of previous characters is 12 units, giving thus a flash value for "*h*" of 396 units. The accumulator 148 was reset to zero at the end of the alphabet sweep during which "P" was projected. This occurred because character "*h*" is located ahead of "P" in the alphabetical sequence which is also the sequence in which the characters cross the line "*a*." Thus the beginning of the next alphabet sweep will find the accumulator 148 reset to zero, and as explained above, character "A" will enter forty-eight units into this accumulator, and so on, until the reference line of "*h*" cuts the line "*a*," which occurs 384 units from the beginning of the alphabet sweep. As 384 units subtracted from the flash value (396 units) of "*h*" is less than forty-eight units, the burst generator 154 starts emitting pulses 384 units of belt displacement after the beginning of the second alphabet sweep. The value in the accumulator 148 increases to reach the flash value of "*h*" at which time the flash occurs. It will be noted that this will occur twelve units after the reference line of "*h*" has crossed the line "*a*" so that a space twelve units wide on the film will be left between the beginning of the line and the extreme left hand limit of "*h*," in order to accommodate the first letter "P." Now, as soon as the flash has occurred, the width of the character "*h*" is transferred into the width accumulator 138 and the rank value of the next character, "*o*" is transferred to the adder 130, where it is added to the accumulated width of "P" plus "*h*," represented by 22 units.

The rank value of "*o*" is 720 units, which, added to the value in the accumulator 138 produces a flash value of 742 units. Now, the machine, continues to operate as explained before, but in this case, because "*o*" is to be found later in the alphabetical sequence than "*h*," this "*o*" will be projected during the same alphabet sweep as "*h*." In the meantime, the shutter band control circuit 170, operating as above, moves the window 50 from the position shown in FIG. 8*b* to the position shown in FIG. 8*c*, that is, by eight more units to the right, because ten units have been added to the width accumulator 138 for "*h*."

The next character of the line, which is "*t*," will be projected in the same manner, and again, as the letter "t" occurs later than "o" in the alphabetical sequence it will be projected during the same alphabet sweep as the "h" and "o." In the meantime, the shutter band is moving by steps of eight units in order to catch up with the accumulated width stored in the accumulator 138.

In the case where one flash lamp only is utilized to flash the selected characters of the line, it is necessary to introduce a minimum delay in the circuit to leave time for the flashing circuit to be readied for the next flash and for the flash lamp to de-ionize. This delay does not ordinarily have to be larger than one millisecond, or approximately the time it takes for three characters to cross the line "a."

There may be other cases where the shutter band does not have time to catch up with the accumulated widths of characters during the composition of a line. For example, if it is decided to project a line starting with "A" as the first character and continuing with "D" which is the fourth character of the alphabet, then "H" which is the eighth character, and so on taking every fourth following character, it might be necessary to project, for typical machine speeds, six characters within approximately seven milliseconds. These six characters may represent, if on the average they are twelve units wide, a total of 72 units. In seven milliseconds, the shutter band may have a limit of movement of 16 to 24 units, which is substantially less than the 72 units it should move to keep up with character projection. The difference between 72 and 24 is larger than the margin left in the window represented, for example, by the distance "d" in FIG. 8f. In this case, as explained above, a comparison circuit included in the digital-to-analog transducer 170 would cause the machine to lose one (or more) cycles to allow time for the shutter band to move forward and be in the proper position for each projection. In normal usage of the machine, however, this extreme case is practically never met.

Going back to the present example, the letter "t" will be flashed, then "o," then "n." The code following "n" can be a justifying space code that will not produce any flash, and it will be understood that its value with have been computed by a suitable justifier and placed in its proper sequence in the memory 126, so that the final line will be flashed in justified form. The width of this justifying space, represented by a certain number of units, is added to the width accumulator as for any flashed character. The decoder is adapted to recognize the justifying space code as one of several special "non-print" codes, and the corresponding width is immediately entered at the same time as the next character is extracted from storage, without waiting for the completion of a full machine cycle.

At the end of a line, the decoder 126 (FIG. 9) detects a carriage return code in the tape (or any other line suitable termination code) and causes the film to move in a direction perpendicular to the direction of line composition for line spacing, and the shutter band 48 is caused to return to zero at the line "a," namely, the position shown in FIG. 8a. Thus, in the example shown the first word in the line, that is, "Photon" would be projected in only four alphabet sweeps as follows: "P" during the first alphabet sweep, followed by "h," "o" and "t" during the second alphabet sweep, "o" during the third alphabet sweep, and "n" during the fourth alphabet sweep. As there are four alphabet sweeps during each cycle of the matrix band in the preferred embodiment, this word will be composed in the time it takes for the band to move just one cycle. If the band is running at such a speed as to have alphabet sweeps every fifteen milliseconds, the whole word will be projected in sixty milliseconds which represents a projection speed of 100 characters per second.

Figure 10:
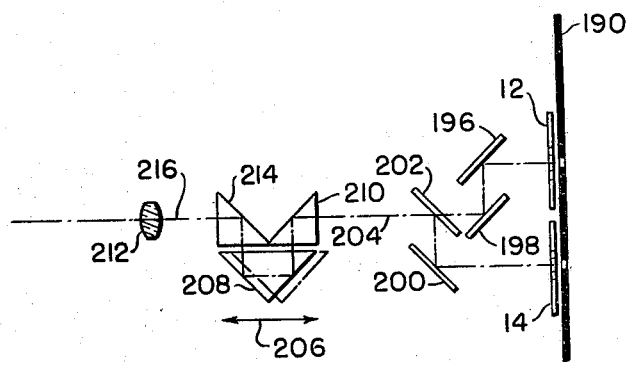
FIG. 10 is a side elevation in section which represents an optical system optionally used for multi-font projection.
Figure 11:
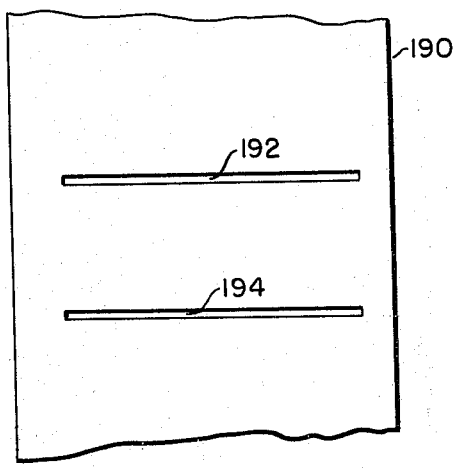
FIG. 11 is a front elevation of a shutter used in conjunction with the device of FIG. 10.

FIGS. 10 and 11 represent means by which alphabets in different rows on the matrix sections 18 can be projected on to the same base line on the film. In FIG. 10 the two matrix bands 12 and 14 are shown. Each matrix band is independently illuminated at the proper time by an independent flashing unit. A shutter 190 shown in more detail in FIG. 11, provided with two elongated apertures 192 and 194, is positioned adjacent to the matrix bands in such a way as to allow only the light emerging from the selected character row to be projected through the optical system. The optical system comprises a conventional optical merging unit with mirrors 196, 198 and 200 and a beam splitter 202. The purpose of this first merging unit is to bring two alphabet rows, one of which is simultaneously selected on each of the two matrix bands, on to the same base line or optical axis represented by a line 204. The selection between the character rows 74, 76, 78, 80 and 82 (FIG. 4) is obtained by displacing in one of two directions shown by an arrow 206 a Porro prism 208, to which merging light beams centered on the line 204 are directed by a first prism 210 and from which the same light beams are deflected to a lens 212 by a prism 214. The horizontal displacement of the prism 208, for example, from the position shown in solid lines to the position shown in dotted lines, causes one or the other of the different alphabet rows to be projected along an optical axis 216, without increasing the optical distance between these alphabets and the projection lens 212. In a modification of this system, the selection of character rows can also be obtained by moving the projection lens 212 up and down in the direction perpendicular to the optical axis 216, rather than by use of the prisms. At the same time as either the lens 212 is shifted, or the Porro prism system is shifted, for style selection, depending on the arrangement in use, the shutter 190 is also moved to place the aperture 192 or 194 opposite the selected style.

Figure 12:
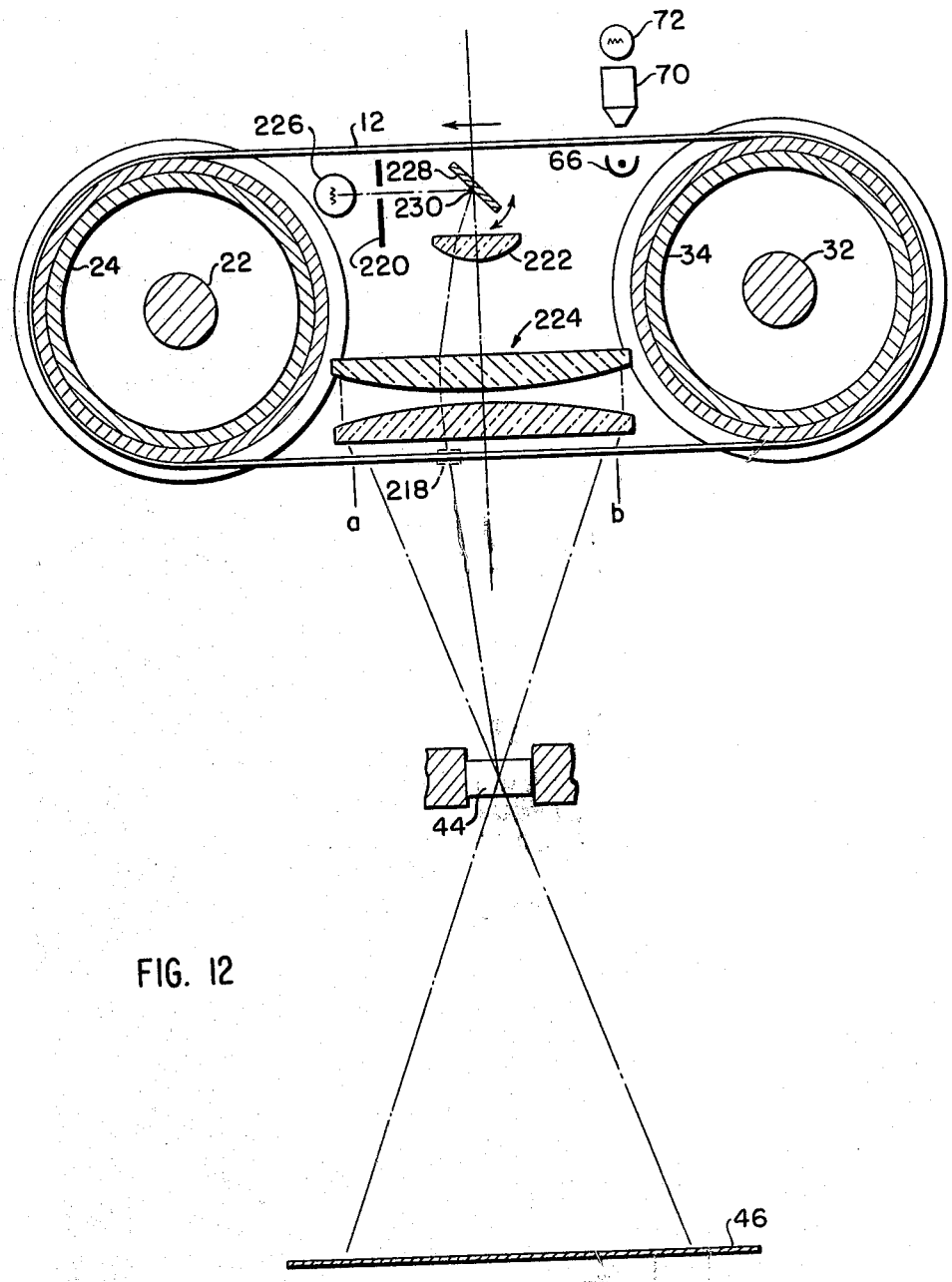
FIG. 12 is a plan view in section of a first alternative embodiment incorporating a moving light beam in place of a shutter band.

In the alternative arrangement of FIGS. 12 and 13 the shutter band 48 (FIG. 1) is replaced by light displacing means forming another kind of luminous beam limiter. In this case the window aperture 50 of the shutter band 48 is replaced by a luminous patch which, when the flash lamp is energized, illuminates an area corresponding to the area uncovered by the window 50 in the embodiment of FIG. 1. In FIG. 12 the luminous patch is shown schematically at 218. This patch is obtained by making an image on the matrix band 12 of an aperture in a mask 220 by means of a lens 222 and a condensing lens system 224. The light emitted by a lamp 226 goes through the aperture of the mask 220 and is deflected by a mirror 228 pivoted at 230. It is evident that by rotating the mirror around the point 230, the window image 218 can be moved along the matrix belt. Any slight image deterioration that may occur because of the quality of the optical system is of no importance because of the relatively large tolerance which is left between the limits of the illuminated patch and the edges of adjacent character areas of the matrix. The mirror 228 is controlled by a digital-to-along converter of the same kind as in the unit 170 described above for the case where the shutter band is utilized.

In the second alternative arrangement of FIG. 13 the shutter band 48 of FIG. 1 is replaced by a drive band 232 operating in exactly the same manner as the shutter band 48 of FIG. 1. However, in the case of FIG. 13 a light source 234 is placed outside the matrix band loop, and a prism or mirror system redirects the light reaching the inner side of the band loop toward a projection lens 236, as shown in FIG. 14. In FIG. 13 the source 234 is a flash lamp associated with a mirror 238 and a condensing lens system 240. The light emitted by the lamp 234 is directed toward the area of the character to be projected by a flexible light guide 242. The flexible light guide is moved to the right during the composition of a line by the drive band 232, and is returned toward the left to the zero position at the end of each line by reversing the stepping motor 52 in the same manner as the shutter band window 50 is returned to zero in the embodiment of FIG. 1. The light guide end adjacent the matrix band is preferably directed toward the lens 236 through the projection prism system, and for this purpose it is supported and oriented on a lever 244 pivoted at 246.

In order to illuminate a particular one of the different alphabet rows on the matrix band, the flexible light guide may be simply moved up or down by a suitable mechanism. Preferably, however, the end of the light guide adjacent the matrix band is flattened as shown in FIG. 14, so that several rows of characters are illuminated each time the flash lamp 234 is operated. In FIG. 14, the matrix band is shown at 12 and a Porro prism 248 is used to deviate light toward the projection lens 236. The purpose of this prism is twofold: it sends the light bundle emerging from the selected character to the lens 236 outside the confines of the matrix band loop, and it also makes it possible to select between the different matrix rows by parallel displacement. For example, when the prism is in the position shown in solid lines in FIG. 14, a row 250 is in projection position, and when the prism is moved to the position shown in dotted lines a row 252 is placed in projection position. A shutter similar to the one shown in FIG. 11 is also used in the case where the light guide is not moved up and down.

In a machine embodying the present invention, the production of lines of different sizes presents no serious problem because proper character spacing on the film is automatically obtained by "optical leverage." The matrix band 12 and the film 46, as shown in FIG. 15, are at a fixed distance, and lenses of different focal length such as 254, 256 and 258 are preferably mounted on a lens turret having its axis of rotation at 260. Any lens can be selectively brought into its operative position shown in the figure. Large characters are obtained by lenses of shorter focal length and small characters by lenses of relatively longer focal length. The shorter the focal length of a lens the closer it will be to the matrix band and consequently the greater will be the optical leverage. This means that for a given length of line fewer characters will be projected to fill the line in a large size than in a small size.

In order to align characters on the left hand margin of text matter to be produced on the film 46, it is preferable to align all the lenses of the turret so that their optical axes, when in operative position, are located on a common line 262 connecting the start point "a" on the band to the edge of the line image at 264 on the film. In this way the character image produced by any lens will be so positioned that the reference lines will be properly located on the start line 264.

Examination of FIG. 15 shows that for an illuminated area a–b on the matrix band, the length of the line produced on the film 46 depends on the location of the selected lens along the line 262. If the film width utilized in the machine is shown at 266, the lens 220 can produce a maximum length of line equal to the film width. The longer local length lens 254 could not produce a line longer than the distance shown at 268. The lens of shorter focal length 258 could produce larger images and could produce lines as long as a dimension 270. In the case of the lens 258, the length of line limitation lies in the film width rather than in the illuminated area of the matrix band.

Using the present invention, it is also possible to mix characters of different sizes in the same line. This result is obtained by multiplying the relative width of each character by a "set" (or "size") factor as described in my joint Patents 2,876,687 and 2,988,276, and also in my joint copending application Ser. No. 312,838, filed Sept. 27, 1963.

In this case "elementary width units" (e.w.u.) are preferably used rather than "relative units" of the kind used in the preceding description. It is convenient to make one e.w.u. equal to one-eighteenth of a one-point em, or approximately .02 millimeter. In order to obtain the width of a character in a given point size for use in the circuits of FIG. 9, the relative width of this character is multiplied by the "set" factor which is generally equal to the nominal point size given. Various multiplying means can be utilized as explained in said Patent No. 2,876,687. If 6-point characters are spaced apart by forty-eight relative units on the band 12, their actual spacing is six times forty-eight or 288 e.w.u.

In the case of the previously described embodiments, the actual spacing in e.w.u. between characters of the matrix, that is, 288 e.w.u. (rather than forty-eight units) will be counted for each character passage, if it is desired to mix characters of different sizes at will, even in the same line, without affecting the justification of the line. Likewise, instead of entering into the width accumulator 138 the relative width of the character just flashed, the product of this relative width by the nominal point size (as determined by the lens 254, 256 or 258 in operating position at this time) is entered. In addition, the stepping motor 52 steps once for every (6×8) or forty-eight e.w.u. entered into the width accumulator 138. The stepping motor counter 176 would also generate (6×8), that is, forty-eight units for each step of the shutter band 48. The "burst generator" 154 of FIG. 9 would also generate one pulse for each e.w.u. of travel of the matrix, that is to say, its frequency would be increased by a factor of six for 6-point matrix characters.

The purpose of the foregoing procedure is to enter larger values in to the width accumulator for characters which will be projected at a larger size than for characters which will be projected at a smaler size. A machine so modified to produce display lines of various character sizes can either use relative width unit codes for the respective characters in the storage, together with a "multiplying" code to modify the value of preceding or following characters, or alternatively, the system described in our Patent No. 2,988,276 may be used, wherein the result of the multiplication of the relative width of each character by a set factor is stored at the time each character is keyboarded.

Although in the preceding description and in the attached figures it has been assumed that flash lamps are utilized, it is evident that any other source of light capable of giving flashes of extremely short duration can be incorporated. In the case where several flash lamps or spark gaps are utilized, it is within the purview of the present invention to use these means either simultaneously in order to increase the light output, or alternatively to shorten the recovery time of the flash system as a whole. Light sources of short duration can also be replaced by electro-optical shutters.

If extremely high composing speeds are desired, each film matrix section 18 such as the one shown in FIG. 4 can include all the letters of one alphabet, in which case the different rows are merged to a common base line through the use of any known optical merging system, such as for example a pair of parallel mirrors. Such mirrors could be positioned between the projection lens and the film. Each character row of the matrix would be merged by multiple reflections and projected on the same base line on the film. Each of these rows in this case would be illuminated by individual flashing means. If flash lamps are utilized, light guides can be provided to make it possible to space the different flash lamps sufficiently. These light guides could be in the form of plastic strips of the same thickness as the distance between two adjacent rows of characters on the matrix. In that variant of the invention, the complete passage of an alphabet would take not more than one window frame, which would make it possible to produce several hundred characters a second. In this alternative there would be at least one independent light source for each character row.

Figure 16:
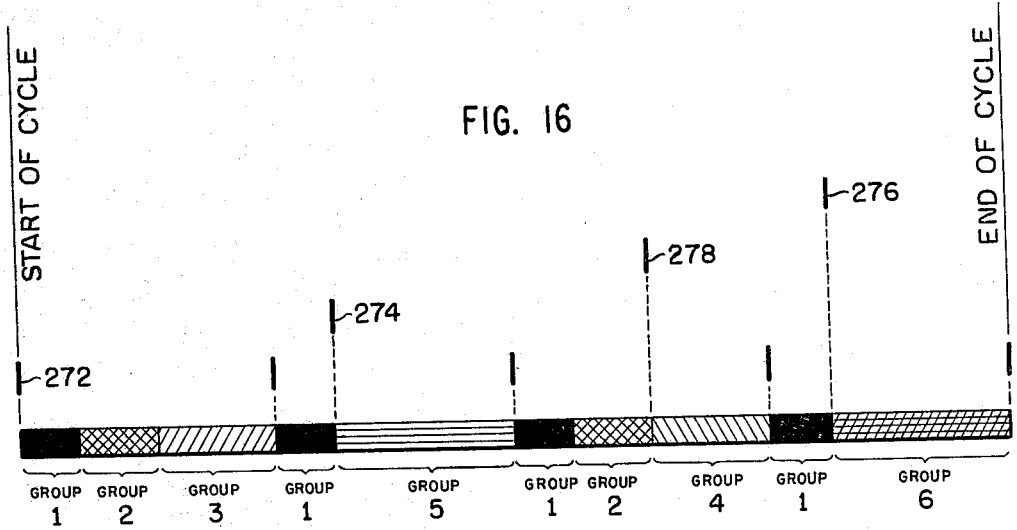
FIG. 16 represents character groups on a matrix band.

In place of the alphabetical rank of characters as given in FIG. 17, the arrangement of FIG 16 may be used, in which the rank is based on the frequency of use of the characters in the English language. It will be understood that the production rate of the machine described herein can be increased if the sweeping time of the series of characters of the matrix is reduced. One way to reduce this time is to increase the speed of the matrix belt. Another way is to reduce the number of selectable characters. There is a limitation on the speed at which a moving character can be projected with a sharp image because, at the present time, currently available flash lamps have a flash duration of at least one microsecond. Other systems such as spark gaps, although faster, present other problems because of the high voltage they require, and also because of their rapid deterioration. On the other hand, the number of selectable characters which may be used in projecting a line comprises normally all the letters of the alphabet, plus punctuation marks, plus figures, etc. These characters are shown in FIG. 17. Although it is desirable to have each of these characters appear at some time during an alphabet sweep, it is well known that certain characters such as "Z" and "X" are infrequently used whilst other characters such as "e" appear about 10 percent of the time in a normal text. In the example illustrated schematically in FIG. 16 the characters listed in FIG. 17 have been broken down into six groups. Group one which, as shown, is repeated four times in one alphabet sweep, includes the seven most frequently used characters "e," "t," "a," "i," "n," "s," and "o." These seven characters appear more than fifty percent of the time in a normal text. Group two includes the ten next most frequently used characters, "r," "h," "d," "l," "u," comma, "c," "m," "f," and period. This group repeated twice along the matrix belt. Group three contains the fourteen next most frequently used characters "w," "y," "p," "b," "g," "v," "—," "k," ";," "q," "j," "x," "z," "/." Group four contains the remaining lower case characters of FIG. 17 and all the figures. Groups three and four do not appear more than once along the sequence. Groups five and six are also not repeated, and they contain all the upper case characters of FIG. 17. In the example shown, there would be 120 characters on the matrix band with seventy-six lower case characters and forty-four upper case characters.

It may be pointed out that in the example of FIG. 16, it has been assumed that upper case characters are on the same matrix level as corresponding lower case characters. This is, of course, not necessary and if the upper case characters are located at another level of the matrix, or on a different matrix band as described in the example of FIG. 3, it is possible to repeat eight times the seven most frequently used characters and four times the next most frequently used characters. In this case it is possible to further increase the speed of the machine for straight matter composition.

As characters having the same identification code are repeated four times during one machine cycle (defined as equal to one complete sweep of the alphabet) in the case of FIG. 16, it is necessary to adapt the character identification system described above in relation to the first described embodiment of the invention.

The arrangement of characters on the matrix bands can also be made in the order of decreasing frequency of use. For example, the "e" would be the first character, followed by "t," "a," "i," etc. The seven most frequently used letters would occupy the first seven places in the matrix sequence (Group one) followed by Group two, etc. In this case the rank accumulator 148 (FIG. 9) which counts one (or one multiplied by a fixed value) for each character passage would be zeroized at the beginning of each passage of the "Group one" characters. This is obtained by a counter zeroizing slit 272 which can be positioned on the matrix film itself.

A special identification and zeroizing photocell impulse mark 274 indicates the beginning of the passage of upper case characters. A similar mark 276 resets the character identity counter 148 to identify the passage of the last group of characters of the upper case sequence. A mark 278 resets the counter 148 to the proper valve to prepare the identification of the last group of the lower case characters. This value would be, using the example of FIG. 16, 7+10+14, which represent respectively the number of characters in Groups 1, 2 and 3, plus one. So in this particular case, the mark 278 would reset the character counter 148 to the value "32." Of course, this "32" can be multiplied in the circuit as explained in relation to the first embodiment of the invention, by a factor which depends on the spacing of characters on the matrix in units. As an alternative, characters can be identified by other marks, for example, such as described in my joint Patents Nos. 2,652,755 and 2,965,010.

It is also possible to replace the matrix band system by a continuously rotating matrix-carrying drum as shown in copending application Ser. No. 338,810, in conjunction with optical means to compensate for the curvature of the matrix section a–b. This compensation may be obtained by the use of lenses or prisms located between the drum area and the projection lens, and also with field flattening lenses close to the film.

The film 46 represented in the drawings can be any kind of radiation sensitive surface. It is conceivable that, with light sources of extremely high intensity, such as lasers, printing plates could be directly obtained. The matrix characters could be in the form of stencils, or in the form of transparent areas etched out of mirror-like light reflecting areas.

While the invention has been described above with reference to a preferred embodiment and to certain alternatives thereto, mention has been made at several points to still other alternate ways of embodying its concepts and securing its advantages in varying degrees. It will be understood, therefore, that the description has had as its primary object the illustration of the principles underlying the invention, as opposed to the structural limitation of its possible embodiments. The scope of the invention should be accordingly construed by that of the claims hereto appended.

Having thus described the invention, I claim:

1. The method of composing type photographically, comprising the steps of causing a plurality of characters to pass in succession and in repetition along a base line, and photographing selected characters individually in spaced locations along said line, said photographing of each character including forming a movable light patch to define a region including a single character at an instant when its image is in a predetermined location on a photo-sensitive material.

2. The method according to claim 1, in which the illumination of each character is controlled as a function of the time of passage of a character past a marginal position on the base line and the total of the widths of the characters and spaces previous to said character.

3. The method of composing type photographically, comprising the steps of causing a plurality of characters to pass in succession and in repetition along a base line, and photographing selected characters individually in spaced locations along said line, said photographing including flash illumination of a plurality of said characters at the instant when the image of the character next to be photographed is in a predetermined location in said line, and limiting the light reaching the photosensitive surface to always project only said character next to be photographed.

4. Photographic type composing apparatus having, in combination, a photosensitive sheet, an optical system in position to focus an image upon the sheet, a support for a plurality of characters, means to move the support continuously relative to the optical system in a path causing the characters to pass successively and repeatedly along a base line an intermittent light source for illuminating the characters, and a luminous beam limiter movable independently of the character support to limit the light projected on to the photosensitized sheet to a region including only the character in the line next following the last character projected therein.

5. The combination according to claim 4, wherein the luminous beam limiter is a shutter member having an aperture therein.

6. The combination according to claim 4, wherein the luminous beam limiter is a shutter member having an aperture therein and means to displace the aperture relative to the sheet as a function of the total widths of the preceding characters and spaces in the line.

7. The combination according to claim 4, wherein the luminous beam limiter includes means to define an aperture for light from the light source, and optical means including a reflector and rotating means to cause the light passing along the aperture to move along a line through which the characters pass in reaching their respective positions for projection.

8. The combination according to claim 4, with a width accumulator, means to accumulate in the width accumulator the widths of the successively projected characters, means to control the instants of illumination as a function of the order of succession of characters and the value in the width accumulator, and means to control the luminous beam limiter as a function of the value in the width accumulator.

9. The combination according to claim 4 in which the characters are arranged as a function of the statistical frequency of their use in text.

10. The combination according to claim 4, in which the order of arrangement of the characters and the frequency of their recurrence in the line of images are functions of the statistical frequency of their use in text.

11. The combination according to claim 4, in which the character carrier is an endless band.

12. The combination according to claim 4, in which the character support is an endless band having master characters in parallel rows arranged circumferentially thereon, and including means to merge the images of the rows on the sensitized sheet.

13. The combination according to claim 4, in which the character carrier is an endless band having master characters in parallel rows arranged circumferentially thereon, and including Porro prism means to merge the images of the rows on the sensitized sheet.

14. The combination according to claim 4, in which the luminous beam limiter includes a flexible light tunnel and means to move the tunnel ends relatively to direct light on to the character support.

15. In type composing apparatus the combination of a character carrier, transparent characters carried on said character carrier, means to continuously move the characters on said character carrier through an elongated projection area, intermittent illumination means adapted to momentarily illuminate characters located in said projection area, optical means adapted to form an image of an illuminated character, illumination limiting means effective to contain the illumination viewed by the optical system to a patch of light slightly larger than the largest character to be illuminated, means to position said illumination limiting means to expose any one of a plurality of positions throughout the said elongated projection area, a photosensitive record medium for recording said image.

16. The combination according to claim 15 wherein the illumination limiting means comprises a shutter having an aperture therein effective to mask all but one of the characters located in the elongated projection area at the moment of illumination, means for successively moving the shutter so that the aperture exposes different portions of the projection area.

17. A type composing apparatus comprising a character carrier, radiation transparent characters on the character carrier, means to position a portion of the character carrier in an elongated projection area, means to continuously move characters through the elongated projection area, an intermittent radiation source, radiation refracting means effective to form an image of a character at an image area, a radiation sensitive surface in the image area, a radiation limiter effective to limit character projection to a portion of the elongated projection area, means for moving the position of the radiation limiter to allow projection of characters in successive portions of the elongated projection area.

References Cited by the Examiner

UNITED STATES PATENTS

| | | | |
|---|---|---|---|
| 1,776,527 | 9/1930 | Uher | 95—4.5 |
| 2,553,285 | 5/1951 | Thomas | 88—24 |
| 3,006,259 | 10/1961 | Blakely | 95—4.5 |

JOHN M. HORAN, *Primary Examiner.*